US010708798B2

(12) United States Patent
Halabian et al.

(10) Patent No.: US 10,708,798 B2
(45) Date of Patent: Jul. 7, 2020

(54) NETWORK PERFORMANCE FRAMEWORK FOR WIRELESS LOCAL AREA NETWORKS

(71) Applicants: Hassan Halabian, Ottawa (CA); Mike Skof, Nepean (CA); Afshin Sahabi, Kanata (CA)

(72) Inventors: Hassan Halabian, Ottawa (CA); Mike Skof, Nepean (CA); Afshin Sahabi, Kanata (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 16/064,769

(22) PCT Filed: Dec. 9, 2016

(86) PCT No.: PCT/IB2016/057505
§ 371 (c)(1),
(2) Date: Jun. 21, 2018

(87) PCT Pub. No.: WO2017/115191
PCT Pub. Date: Jul. 6, 2017

(65) Prior Publication Data
US 2018/0376360 A1    Dec. 27, 2018

Related U.S. Application Data

(60) Provisional application No. 62/272,149, filed on Dec. 29, 2015.

(51) Int. Cl.
*H04W 4/00*    (2018.01)
*H04W 24/08*    (2009.01)
(Continued)

(52) U.S. Cl.
CPC ......... *H04W 24/08* (2013.01); *H04L 41/0823* (2013.01); *H04L 43/0876* (2013.01);
(Continued)

(58) Field of Classification Search
CPC .................................................... H04W 24/02
See application file for complete search history.

(56) References Cited

U.S. PATENT DOCUMENTS

| 7,949,342 | B2 * | 5/2011 | Cuffaro | ................. | H04W 16/08 |
| | | | | | 455/452.2 |
| 9,173,116 | B2 | 10/2015 | Ding et al. | | |

(Continued)

FOREIGN PATENT DOCUMENTS

| EP | 1895714 A1 | 3/2008 |
| EP | 2905983 A1 | 8/2015 |

(Continued)

OTHER PUBLICATIONS

Wireless Wi-Fi: Wi-Fi Radio Resource Management (RRM)/Self Organizing Networks (SON) Technical Report; 2014; 14 pages.
(Continued)

*Primary Examiner* — Guang W Li
(74) *Attorney, Agent, or Firm* — François Cartier; Ericsson Canada Inc.

(57) ABSTRACT

Methods and systems are provided for the determination of the channel capacity of access points in a wireless communication network. Methods and systems are also provided for the management of radio resources in a wireless communication network based at least in part on the determined channel capacity of the access points and/or on at least one network performance statistic derived therefrom.

18 Claims, 9 Drawing Sheets

(51) Int. Cl.
*H04W 24/02* (2009.01)
*H04L 12/24* (2006.01)
*H04L 12/26* (2006.01)
*H04W 72/08* (2009.01)
*H04W 84/12* (2009.01)

(52) U.S. Cl.
CPC ......... *H04W 24/02* (2013.01); *H04W 72/085* (2013.01); *H04W 84/12* (2013.01)

(56) References Cited

U.S. PATENT DOCUMENTS

| | | | | |
|---|---|---|---|---|
| 9,961,557 | B2* | 5/2018 | Sun | H04W 16/14 |
| 2004/0039817 | A1* | 2/2004 | Lee | H04W 24/00 |
| | | | | 709/225 |
| 2004/0047311 | A1* | 3/2004 | Pekonen | H04B 7/2656 |
| | | | | 370/331 |
| 2005/0208942 | A1* | 9/2005 | Pekonen | H04W 36/30 |
| | | | | 455/436 |
| 2005/0276276 | A1 | 12/2005 | Davis | |
| 2006/0189322 | A1* | 8/2006 | Conte | H04W 72/0406 |
| | | | | 455/453 |
| 2006/0262765 | A1 | 11/2006 | Peleg et al. | |
| 2007/0072614 | A1* | 3/2007 | Forsberg | H04W 36/30 |
| | | | | 455/436 |
| 2014/0112175 | A1* | 4/2014 | Pantelidou | H04W 28/26 |
| | | | | 370/252 |
| 2014/0247743 | A1* | 9/2014 | Seo | H04W 24/10 |
| | | | | 370/252 |
| 2015/0237519 | A1 | 8/2015 | Ghai | |
| 2015/0341816 | A1* | 11/2015 | Lee | H04L 5/0092 |
| | | | | 370/252 |
| 2015/0341939 | A1* | 11/2015 | Sharma | H04W 72/08 |
| | | | | 370/329 |
| 2016/0095129 | A1* | 3/2016 | Hoyhtya | H04W 16/14 |
| | | | | 370/330 |
| 2016/0338118 | A1* | 11/2016 | Vajapeyam | H04B 17/318 |
| 2017/0013490 | A1* | 1/2017 | Lunttila | H04W 24/10 |
| 2017/0048824 | A1* | 2/2017 | Yerramalli | H04W 72/04 |

FOREIGN PATENT DOCUMENTS

| | | |
|---|---|---|
| WO | 2013/152305 A1 | 10/2013 |
| WO | 2014/10726 A1 | 7/2014 |
| WO | 2016/001397 A2 | 1/2016 |

OTHER PUBLICATIONS

M. Yu et al.: IEEE Transactions on Wireless Communications: "A Dynamic Radio Resource Management Technique or Multiple APs in WLANs"; vol. 5. No. 7, Jul. 2006; 10 pages.
Aruba White Paper: ARM Yourself to Increase Enterprise WLAN Data Capacity; 2013; 24 pages.
Gang Wu et al.: "Passive and Accurate Traffic Load Estimation for Infrastructure-Mode Wireless LAN"; Oct. 2007; 8 pages.
T. Bonald, et al., "Traffic Capacity of Multi-Cell WLANs", in SIGMETRICS'08, Annapolis, MD, USA, 2008; 12 pages.
S.-C. Yang, et al., "A Hybrid Measurement Approach to Medium Occupied Time for Radio Resource Management in IEEE 802.11 Networks", Int. J. of Distributed Sensor Networks, vol. 2015, article ID 719671, Apr. 2015; 9 pages.
"RRM technology", Hewlett-Packard Dev. Co., L.P., 5998-6999, Oct. 2014; 7 pages.
"HP Unified Wired-WLAN RRM Overview", Hewlett-Packard Dev. Co., L.P., 4AA5-8643ENW, May 2015; 15 pages.
M. Yu, et al., "An Adaptive Radio Resource Management Technique for APs in WLANs", in Proc. of ICON'04, Nov. 2004; 7 pages.

* cited by examiner

NETWORK PERFORMANCE FRAMEWORK FOR WIRELESS LOCAL AREA NETWORKS

RELATED APPLICATIONS

The present application claims the benefits of priority of U.S. Provisional Patent Application No. 62/272,149, entitled "NETWORK PERFORMANCE FRAMEWORK FOR WIRELESS LOCAL AREA NETWORKS", and filed at the United States Patent and Trademark Office on Dec. 29, 2015, the content of which is incorporated herein by reference.

TECHNICAL FIELD

The present description generally relates to radio resource management in wireless communication networks, and more particularly relates to network performance measurements for radio resource management in wireless communication networks.

BACKGROUND

Wireless Local Area Networks (WLANs) are used to provide wireless access to the Internet and/or other communication networks for wireless stations. The IEEE 802.11 standard encompasses a set of Media Access Control (MAC) layer and physical (PHY) layer specifications for implementations of WLANs. The IEEE 802.11 standard defines two modes of operation for WLANs. In the independent mode of operation, the wireless stations can directly connect to each other by setting up an ad hoc network. In the infrastructure mode of operation, communication is provided to the wireless stations through an access point (sometimes referred to as an AP in IEEE 802.11). In the IEEE 802.11 standard, a single AP, together with the wireless stations it serves, constitute a Basic Service Set (BSS). In this regard, the access point is generally responsible for controlling and scheduling all the downlink transmissions in the BSS.

Despite the availability of the two modes of operation, WLANs are massively deployed in the infrastructure mode. In addition, many WLANs comprise more than one access points. While an access point can adjust many MAC layer and PHY layer parameters to improve the performance of the BSS, these adjustments may not necessarily result in improved performances for the whole WLAN when many access points are involved. This is due at least in part to the fact that the radio access mechanism in IEEE 802.11 is based on a random access technique called Carrier Sense Multiple Access with Collision Avoidance (CSMA/CA) in which each WLAN network node, either access point or wireless stations, tries to grab the channel independently using a random back-off counter. Therefore, transmissions in the uplink (i.e. from the wireless stations to the access point) and downlink (i.e. from the access point to the wireless stations) in one BSS, and also among multiple BSSs in a WLAN, can collide or interfere with each other. Hence the performances of the BSSs in a WLAN are often correlated as the transmissions in one BSS can impact, or interfere with, the transmissions in a neighboring BSS.

Hence, in addition to distributed network optimization solutions for WLANs, that is solutions where the optimization is performed at the access point level, there are also centralized solutions in which the network optimization is performed at the WLAN level, that is the network is optimized as an entity instead of optimizing each individual BSS in the network. In that sense, radio resource management (RRM) is the process by which the radio resources of the network are controlled and adjusted in order to efficiently use the available resources across the network. Network operators often deploy centralized RRM network controllers, also known as Self-Organized Network (SON) managers, in their networks. These controllers are usually responsible for continuous network performance monitoring and optimization by controlling network level and/or access point level configuration parameters.

Still, while there are various per access point metrics useful to monitor the performance of a given access point, these metrics fail to provide a network-wide view of the performance of the whole network. Without a network-wide view of the performance of the network, it is difficult to ascertain the effects on the performance of the network of modifications to the RRM configuration parameters. Without a network-wide view of the performance of the network, network optimization performed by a network controller may be limited.

SUMMARY

Some embodiments provide methods and systems for determining the channel capacity of access points in a wireless communication network. Some embodiments provide methods and systems for managing radio resources in the wireless communication network based at least in part on the determined channel capacity of the access points and/or based at least in part on at least one network performance statistic derived from the channel capacity of the access points.

According to one aspect, some embodiments include a method of operating a network controller to determine a channel capacity of an access point in a wireless local area network (WLAN). The method comprises retrieving, from the access point, channel usage measurements and data transmission measurements determined during a predetermined time period. The method further comprises determining a channel capacity of the access point based at least in part on the channel usage measurements, the data transmission measurements, and the predetermined time period.

In some embodiments, retrieving the channel usage measurements and the data transmission measurements from the access point may comprise receiving the channel usage measurements and the data transmission measurements from the access point. In some embodiments, retrieving the channel usage measurements and the data transmission measurements from the access point may further comprise requesting the channel usage measurements and the data transmission measurements from the access point prior to receiving the channel usage measurements and the data transmission measurements from the access point.

In some embodiments, the channel usage measurements may comprise an idle channel time measurement and a busy channel time measurement. In some embodiments, the data transmission measurements may comprise a transmitted data measurement and a received data measurement.

According to another aspect, some embodiments include a method of operating a network controller to manage radio resources in a wireless local area network (WLAN) comprising a plurality of access points. The method comprises determining radio resource management (RRM) configuration parameters for each of the plurality of access points, and transmitting the determined RRM configuration parameters to each of the plurality of access points. The method further comprises obtaining a channel capacity of each of the plurality of access points, the channel capacity being determined at least in part on channel usage measurements and data transmission measurements obtained during a predetermined time period. The method further comprises determining at least one network performance statistic based at least in part on the channel capacity of each of the plurality of access points.

In some embodiments, the method may further comprise comparing the determined at least one network performance statistic with a previously determined at least one network performance statistic. In some embodiment, the method may further comprise determining new RRM configuration parameters for each of the plurality of access points based at least in part on a result of the comparison.

In some embodiments, obtaining the channel capacity of each of the plurality of access points may comprise retrieving the channel capacity from each of the plurality of access points. In such embodiments, the channel capacity is generally determined remotely by the access points before being transmitted to the network controller. In some embodiments, retrieving the channel capacity from each of the plurality of access points may comprise receiving the channel capacity from each of the plurality of access points. In some embodiments, retrieving the channel capacity of each of the plurality of access points may further comprise requesting the channel capacity from at least one of the plurality of access points prior to receiving the channel capacity.

In some embodiments, obtaining the channel capacity of each of the plurality of access points may comprise retrieving the channel usage measurements and the data transmission measurements, as determined during the predetermined period of time, from each of the plurality of access points, and determining the channel capacity of each of the plurality of access points based at least in part on the channel usage measurements and the data transmission measurements, as determined during the predetermined time period, from each of the plurality of access points. In such embodiments, the channel capacity is generally determined locally by the network controller. In some embodiments, retrieving the channel usage measurements and the data transmission measurements from each of the plurality of access points may comprise receiving the channel usage measurements and the data transmission measurements from each of the plurality of access points. In some embodiments, retrieving the channel usage measurements and the data transmission measurements from each of the plurality of access points may further comprise requesting the channel usage measurements and the data transmission measurements from at least one of the plurality of access points prior to receiving the channel usage measurements and the data transmission measurements.

In some embodiments, the channel usage measurements may comprise an idle channel time measurement and a busy channel time measurement. In some embodiments, the data transmission measurements may comprise a transmitted data measurement and a received data measurement.

According to another aspect, some embodiments include a network controller configured, or operable, to perform one or more network controller functionalities as described herein.

In some embodiments, the network controller may comprise a communication interface configured to communicate with one or more communication networks and/or with one or more network nodes (e.g. access points), and processing circuitry operatively connected to the communication interface, the processing circuitry being configured to perform one or more network controller functionalities as described herein. In some embodiments, the processing circuitry may comprise one or more processor and one or more memory storing instructions which, upon being executed by the processor, cause the processor to perform one or more network controller functionalities as described herein.

In some embodiments, the network controller may comprise one or more functional modules configured to perform one or more network controller functionalities as described herein.

According to another aspect, some embodiments include a non-transitory computer-readable medium storing a computer program product comprising instructions which, upon being executed by processing circuitry (e.g., a processor) of the network controller, configure the processing circuitry to perform one or more network controller functionalities as described herein.

According to another aspect, some embodiments include a method to determine a channel capacity of an access point in a wireless local area network (WLAN). The method comprises, during a predetermined time period, determining channel usage measurements and data transmission measurements. The method further comprises determining the channel capacity of the access point based at least in part on the channel usage measurements, the data transmission measurements, and the predetermined time period.

In some embodiments, the method may further comprise transmitting the determined channel capacity to a network controller. In some embodiments, the method may further comprise receiving a request for the determined channel capacity from the network controller.

In some embodiments, the channel usage measurements may comprise an idle channel time measurement and a busy channel time measurement. In some embodiments, the data transmission measurements may comprise a transmitted data measurement and a received data measurement.

According to another aspect, some embodiments include an access point configured, or operable, to perform one or more access point functionalities as described herein.

In some embodiments, the access point may comprise a communication interface configured to communicate with one or more communication networks and/or with one or more network nodes (e.g. network controller, wireless stations, access points), and processing circuitry operatively connected to the communication interface, the processing circuitry being configured to perform one or more access point functionalities as described herein. In some embodiments, the processing circuitry may comprise one or more processor and one or more memory storing instructions which, upon being executed by the processor, cause the processor to perform one or more access point functionalities as described herein.

In some embodiments, the access point may comprise one or more functional modules configured to perform one or more access point functionalities as described herein.

According to another aspect, some embodiments include a non-transitory computer-readable medium storing a computer program product comprising instructions which, upon being executed by processing circuitry (e.g., a processor) of the access point, configure the processing circuitry to perform one or more access point functionalities as described herein.

Hence, using the channel capacity of each access point in a wireless local area network, some embodiments may allow a network controller, and ultimately the network operator, to determine whether a RRM configuration provides improved network performances compared with a previous RRM configuration by comparing at least one network performance statistic determined at least in part from the channel capacity of the access points in the network with at least one previously determined network performance statistic.

Other aspects and features will become apparent to those ordinarily skilled in the art upon review of the following description of exemplary embodiments in conjunction with the accompanying figures.

BRIEF DESCRIPTION OF THE DRAWINGS

A more complete understanding of the embodiments described herein, and the attendant advantages and features thereof, will be more readily understood by reference to the following detailed description when considered in conjunction with the accompanying drawings wherein.

DETAILED DESCRIPTION

Figure 1:
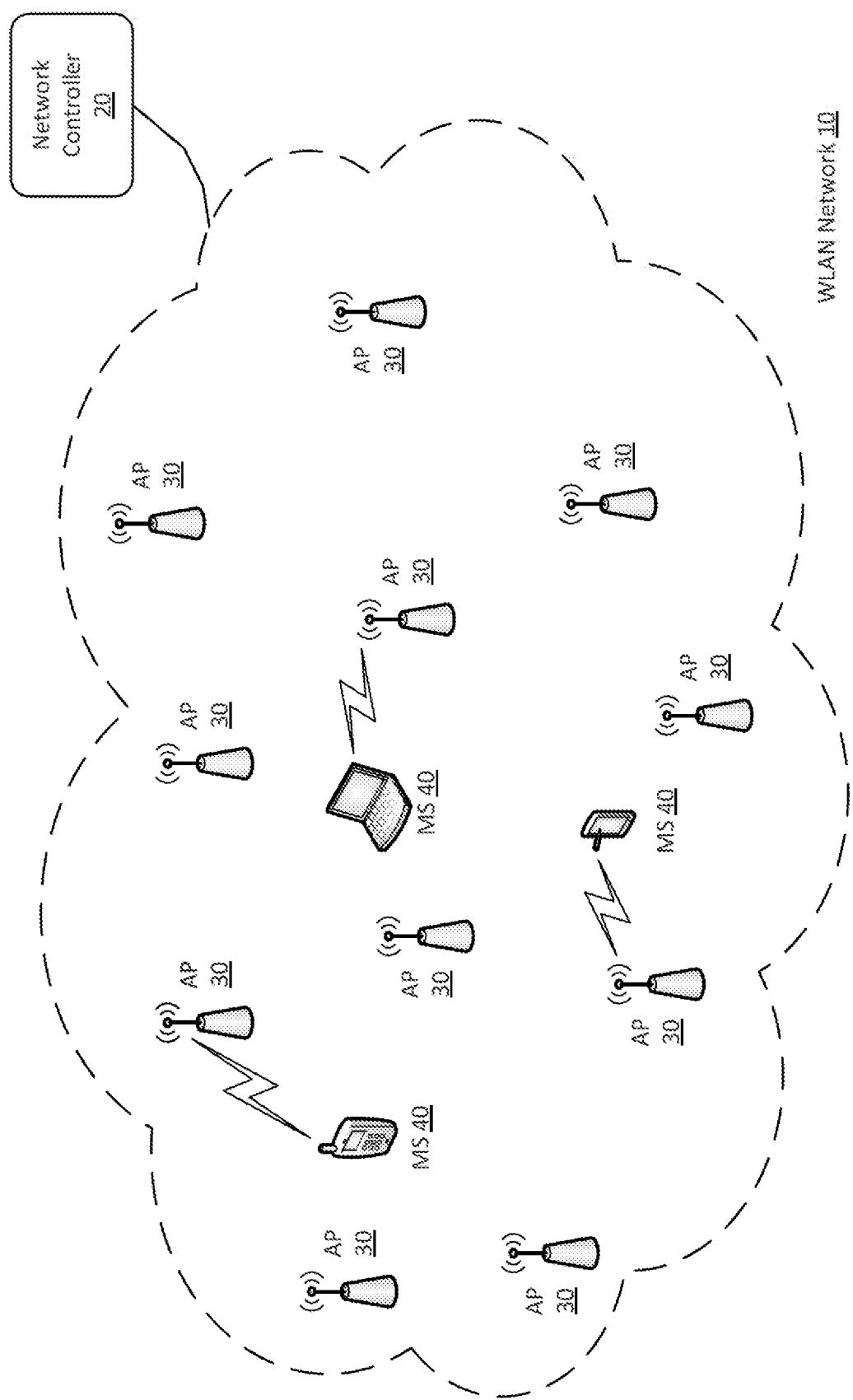
FIG. 1 illustrates an example wireless local area network in accordance with some embodiments.

The embodiments set forth below represent information to enable those skilled in the art to practice the embodiments. Upon reading the following description in light of the accompanying drawing figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

In the specification, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

Some embodiments provide methods and systems to determine the channel capacity of an access point in a wireless communication network such as a wireless local area network (WLAN). The channel capacity generally provides an indication of the potential throughput of the access point, that is an amount of data (e.g. bit, bytes, etc.) that can be transmitted and/or received by the access point per unit of time. In that sense, some embodiments provide methods and systems to manage radio resources in a wireless communication network such as a WLAN based at least in part on the determined channel capacity of the access points and/or on at least one network performance statistic derived therefrom.

Several embodiments will be described in the context of IEEE standards and more particularly in the context of the IEEE 802.11 standard which describes the operation of certain wireless local area networks (WLAN), commonly referred to as Wi-Fi networks. Still, references to the IEEE 802.11 standard and to its terminology should not be construed as limiting the scope of the present description to such standard.

Referring now to FIG. 1, an example network 10 in which embodiments can be deployed is shown. Network 10 generally comprises a network controller 20 (e.g. a radio resource management node, a self-organizing network (SON) manager, etc.) and a plurality of radio base stations 30 generally referred to as access points, or APs, in IEEE 802.11 terminology. The network controller 20 is generally configured to monitor the proper operation of the network 10 and of the various access points 30, and to update or otherwise adjust the operating parameters, including RRM configuration parameters, of the access points 30 on a regular basis and/or in response to events in the network 10. For their part, the access points 30 are generally configured to provide wireless access to the Internet and/or other communication networks to the wireless stations 40 in the network 10.

Notably, wireless station is a non-limiting expression comprising any device equipped with a wireless interface allowing the transmission and reception of wireless signals to and from the access point. Some examples of a wireless station include a wireless device, a wireless communication device, a user equipment (UE), an access terminal, a mobile terminal, a mobile station, etc.

When a wireless communication network operates according to the IEEE 802.11 standard, most, if not all, the access points operate within the same unlicensed frequency band (i.e. the 2.4 GHz unlicensed frequency band, the 5 GHz unlicensed frequency band). To avoid neighboring access points and the wireless stations they serve from interfering with each other, the common frequency band is usually partitioned into 13 channels whose bandwidth is 20 MHz. Only three out of these 13 channels are mutually non-overlapping. Most network operators set their access points to work on the non-overlapping channels.

Figure 2:
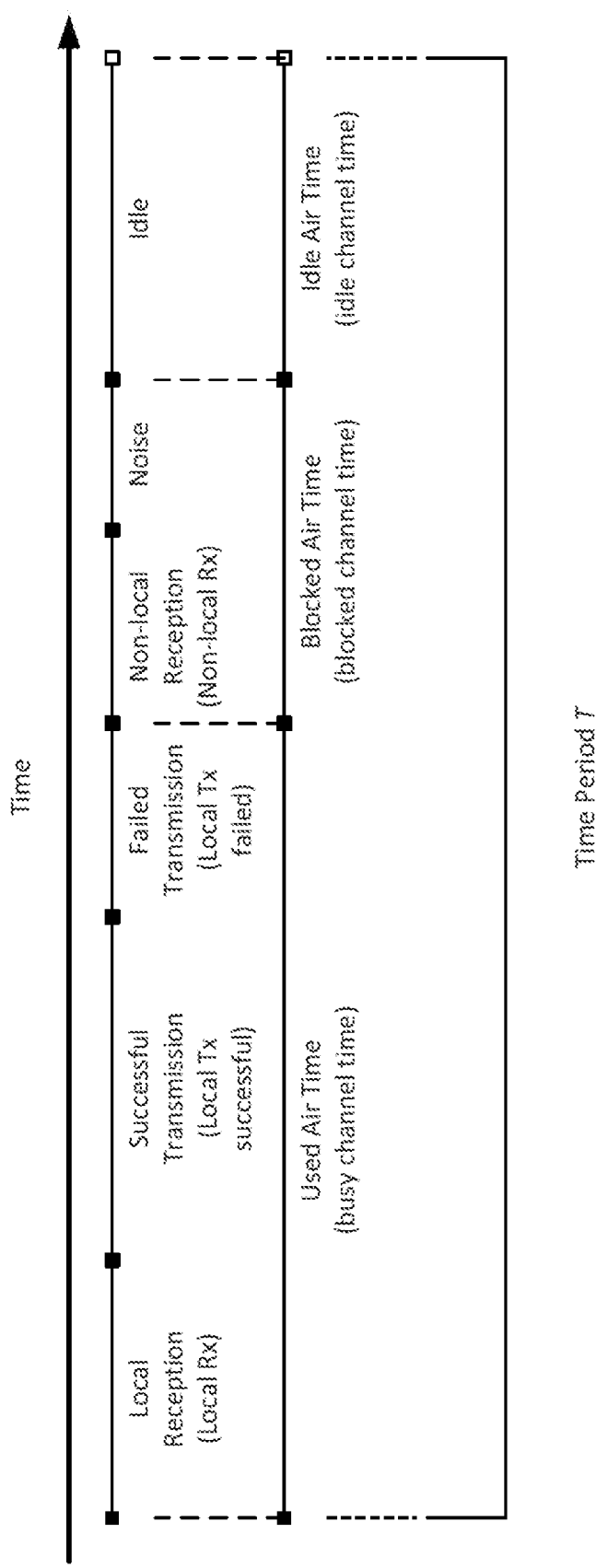
FIG. 2 illustrates an example subdivision of channel usage time in accordance with some embodiments.

During normal operation, the channel usage as seen by an access point 30 can be divided into six subdivisions. FIG. 2 illustrates an example of the subdivision of the channel usage from the perspective of an access point 30 in the network 10. As illustrated, during a given time period T, the access point 30 may receive data from one or more wireless stations 40 (subdivision Local Reception), that is wireless stations 40 located in the local BSS, and may successfully transmit data to one or more wireless stations 40 (subdivision Successful Transmission). The access point 30 may also fail to successfully transmit data to one or more wireless stations 40 (subdivision Failed Transmission). This may occur if the access point 30 tries to transmit data to one or more wireless stations 40 but the transmission fails due, for instance, to interference from neighboring access points 30 and/or from wireless stations 40 served by these neighboring access points 30. Whether or not the local reception and transmission are successful, the time during which the access point 30 either successfully or unsuccessfully receive data and successfully or unsuccessfully transmit data in the local BSS can be referred to as Used Air Time, that is the time during which the access point 30 is actively using the channel for local BSS transmission and reception. The subdivisions also comprise times during which the channel is blocked. In some cases, the channel may be blocked due to non-local reception (subdivision Non-local Reception), that is reception coming from neighboring access points 30 and/or coming from wireless stations 40 served by these neighboring access points 30. When the access point 30 detects such non-local receptions, it cannot use the channel. In some cases, the channel may be blocked due to noise (subdivision Noise). In some embodiments, the access point 30 considers the channel to be blocked when it detects WLAN or non-WLAN signal above a predetermined threshold (e.g. −62 dBm in IEEE 802.11). Finally, the idle part of the subdivisions (subdivision Idle) is the time that could have been used by the access point 30 but was not used due, for instance, to lower load demand.

When a network operator wishes to deploy a new RRM configuration in the network 10, the network operator should be able to measure or otherwise compare the performance of the network before the new RRM configuration is deployed and after it is deployed.

While there are various per access point metrics which monitor the performances at the access point level, these metrics generally fail to provide a network-wide view of the network performance.

In accordance with some embodiments, an Access Point (AP) Channel Capacity (ACC) metric is defined to provide an indication of the amount of data a given access point is capable of transmitting and/or receiving per unit of time. In other words, the ACC provides an indication of the potential throughput of a given access point. The ACC is determined using channel usage measurements and data transmission measurements obtained during a predetermined period of time.

Broadly, the ACC can be understood as a measure of the data throughput (i.e. data transmission measurements during a period of time) adjusted or otherwise scaled by a channel usage factor. As such, in some embodiments, the ACC can be calculated as follows:

ACC=(channel usage factor)×(data throughput)

The channel usage factor is generally a measure of how much the channel was actively used during the period of time while the data throughput is generally a measure of the throughput, also during the period of time. In that sense, the channel usage factor is generally used to scale up the data throughput to take into account the fact that the channel may not have been actively used for the whole duration of the period of time. Hence, the channel usage factor may take into account the idleness of the channel.

In some embodiments, the channel usage factor is a function of a ratio between the time the channel was idle (idle channel time) and the time during which channel was busy (busy channel time). Hence, in such embodiments, the ACC may be calculated as follows:

$$ACC = \left(1 + \frac{\text{idle channel time}}{\text{busy channel time}}\right) \times (\text{data throughput})$$

When the channel usage factor is a function of a ratio between the time the channel was idle (idle channel time) and the time during which channel was busy (busy channel time), the ACC effectively takes into account the idleness of the channel and thus how much more data the access point could have transmitted or received should the access have been active also during the idle channel time. From the above equation, it follows that if during the period of time, the channel is not idle, then ACC is equal to the throughput. However, as soon as the channel is idle for at least some portion of the period of time, then the ACC is higher than the throughput since the channel usage factor will be greater than 1. For example, using the previous equation, if the idle channel time is equal to the busy channel time, the channel usage factor equals two and the ACC becomes equals to twice the measured throughput.

In some embodiments, the data throughput is further determined using data transmission measurements obtained during a period of time T. In such embodiments, the ACC would be calculated as follows:

$$ACC = \left(1 + \frac{\text{idle channel time}}{\text{busy channel time}}\right) \times \left(\frac{\text{data transmission}}{T}\right)$$

In some embodiments, the data transmission measurements include the amount of transmitted data (tx data) and the amounted of received data (rx data) during the period of time T. In such embodiments, the ACC would be calculated as follows:

$$ACC = \left(1 + \frac{\text{idle channel time}}{\text{busy channel time}}\right) \times \left(\frac{\text{tx data} + \text{rx data}}{T}\right)$$

Notably, depending on the objectives of the RRM configuration, the ACC could be calculated only for transmitted data (i.e. ACC on the downlink, $ACC_{DL}$) or could be calculated only for received data (i.e. ACC on the uplink, $ACC_{UL}$), as follows:

$$ACC_{DL} = \left(1 + \frac{\text{idle channel time}}{\text{busy channel time}}\right) \times \left(\frac{\text{tx data}}{T}\right)$$

$$ACC_{UL} = \left(1 + \frac{\text{idle channel time}}{\text{busy channel time}}\right) \times \left(\frac{\text{rx data}}{T}\right)$$

Figure 3A:
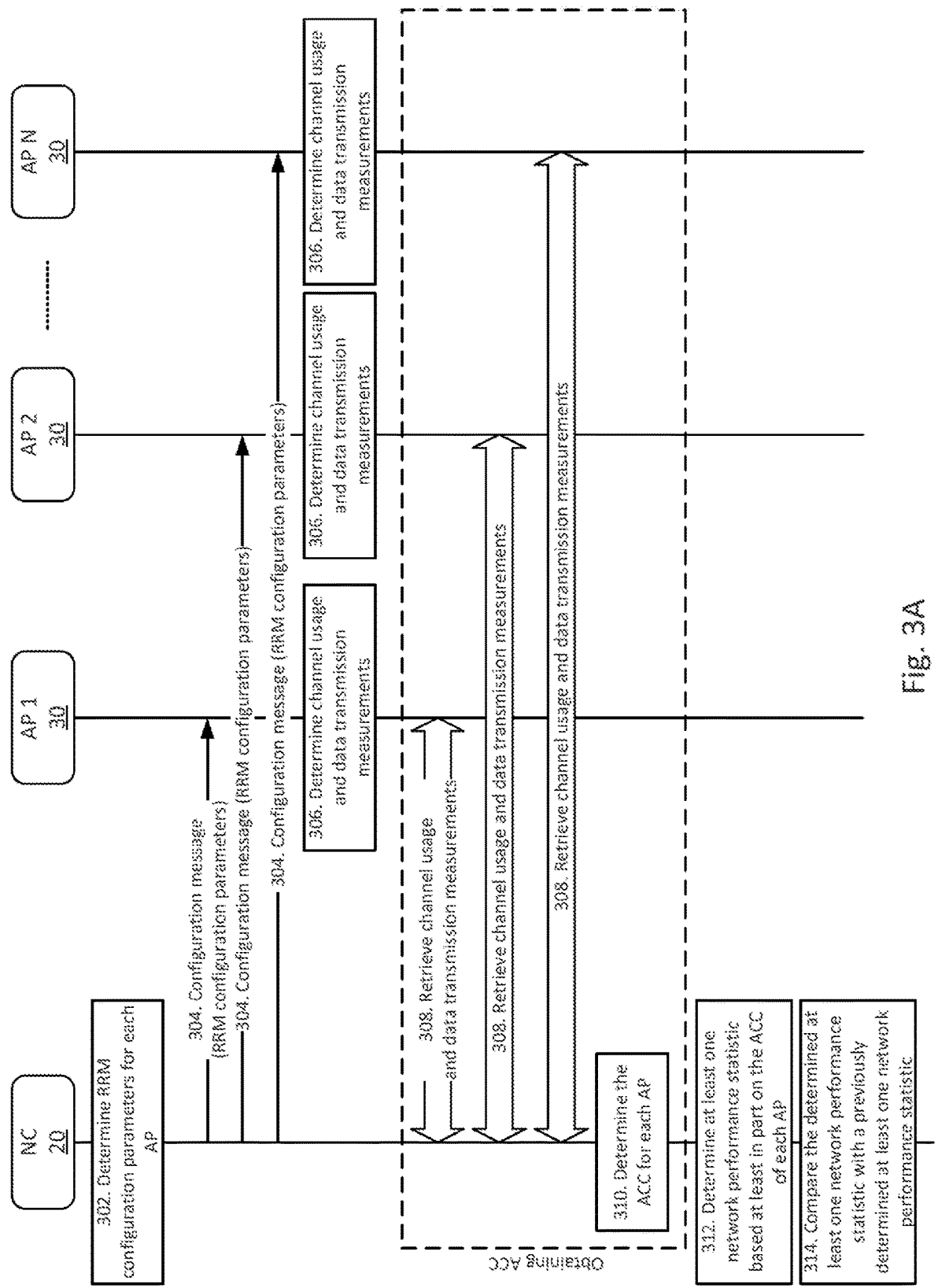
FIGS. 3A and 3B illustrate signaling diagrams in accordance with some embodiments.
Figure 3B:
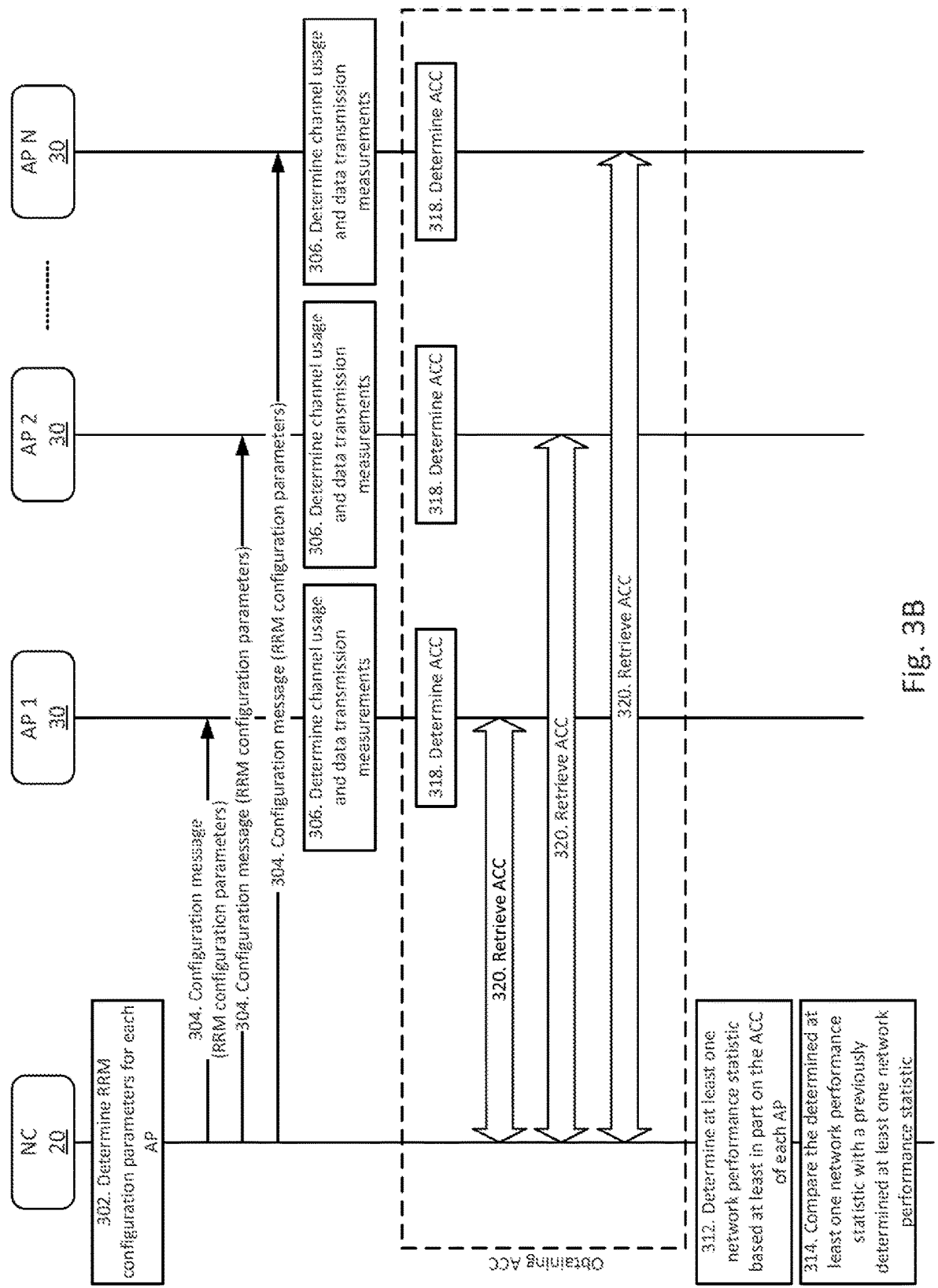

FIGS. 3A and 3B illustrate signaling diagrams according to some embodiments. In FIG. 3A, the ACC for each access point 30 (referred to as AP 30) of the WLAN 10 is determined or otherwise calculated at the network controller 20 (referred to as NC 20).

As illustrated, the network controller 20 determines RRM configuration parameters for each access point 30 of the network 10 (at 302). These RRM configuration parameters may comprise channel selection, transmit power control, receiver sensitivity, channel bandwidth, etc. Once the RRM configuration parameters are determined for each access point 30, the network controller 20 transmits the determined RRM configuration parameters to each access point 30 (at 304). The RRM configuration parameters may be transmitted via a configuration message.

Subsequently, each access point 30 determines channel usage measurements and data transmission measurements for a predetermined period of time (e.g. period of time T) (at 306). These channel usage measurements may include measurements of how long the channel was busy (e.g. busy channel time), how long the channel was idle (e.g. idle channel time), and data transmission measurements may include the amount of transmitted data (e.g. transmitted byte count) and the amount of received data (e.g. received byte count). Each access point 30 may temporarily store the measurements into a memory.

At some point later, the network controller 20 retrieves the channel usage measurements and the data transmission measurements from each access point 30 (at 308). In some embodiments, the access points 30 may be configured to autonomously (i.e. without previously receiving a request) transmit the channel usage measurements and the data transmission measurements to the network controller 20. This autonomous transmission may be periodic or aperiodic. In such embodiments, retrieving the channel usage measurements and data transmission measurements from each access point 30 may thus simply entail receiving the channel usage measurements and data transmission measurements from the access points 30. In other embodiments, retrieving the channel usage measurements and data transmission measurements from each of the access points 30 may comprise the network controller 20 requesting the channel usage measurements and data transmission measurements from each access point 30, e.g., via a request message, and then receiving the requested channel usage measurements and data transmission measurements from each access point 30. Notably, in such embodiments, the determination of the channel usage measurements and data transmission measurements by the access points 30 may occur after the access points 30 receive the request for the channel usage measurements and data transmission measurements but before the access points 30 transmit the channel usage measurements and data transmission measurements.

Following the retrieval of the channel usage measurements and data transmission measurements from each access point 30, the network controller 20 determines the ACC for each access point 30 (at 310). The determination of the ACC for each access point 30 may comprise processing the channel usage measurements and data transmission measurements to extract the required values (e.g. busy channel time, idle channel time, tx data, rx data, etc.). In embodiments where the values needed for the ACC determination are already available at the access points 30, the network controller 20 may not need to process the received measurements to extract the required values. Notably, in some embodiments, the measurements needed to determine the ACC of a given access point 30 are all available in access points 30 compliant with the TR-069 data model.

The process of retrieving the channel usage measurements and data transmission measurements from each access point 30 and of determining the ACC for each access point 30 may be viewed as obtaining the ACC for each access point 30.

Once the network controller 20 has determined the ACC for each access point 30, the network controller 20 determines at least one network performance statistic based, at least in part, on the determined ACC of each access point 30 (at 312). In some embodiments, the determined network performance statistic or statistics may include an average ACC (i.e. the average of the ACC of all the access points 30), or an average ACC and an ACC variance. In other embodiments, the determined network performance statistic or statistics may include a classification, distribution and/or ranking of the access points 30 as a function of their respective ACC. In that sense, the network controller 20 may determine the number of access points 30 which ACC falls within predetermine ranges. In some embodiments, the determined network performance statistic or statistics may include percentile ranking of the access points 30 as a function of their respective ACC. Understandably, the network controller 20 may be configured to determine more than one network performance statistic based at least in part on the determined ACC of each access point 30 and the determined network performance statistic or statistics may vary depending, for instance, on the RRM configuration parameter or parameters that need to be improved or at least adjusted.

After having determined at least one network performance statistic based at least in part on the determined ACC of each access point 30, the network controller 20 compares the determined at least one network performance statistic with at least one previously determined network performance statistic to determine whether the RRM configuration parameters, previously determined at 302, have resulted in better, equal, or worse, network performances (at 314). The result of this comparison may be used to adjust the RRM configuration parameters (e.g. change channel selection, adjust transmit power control, etc.) of one or more access points 30.

Understandably, the sequence of determining RRM configuration parameters, transmitting the RRM configuration parameters to each access point 30, obtaining the ACC for each access point 30, determining at least one network performance statistic, and comparing the determined at least one network performance statistic with at least one previously determined network performance statistic may be performed periodically and/or upon the network controller 20 detecting or being notified of an event (e.g. activation of an access point 30, failure of an access point 30, detection of an overload condition, etc.).

In FIG. 3B, the signaling between the network controller 20 and the access points 30 is similar to the signaling illustrated in FIG. 3A, except for the process of obtaining the ACC of each access point 30. In FIG. 3A, the ACC is determined at the network controller 20 after it has retrieved the channel usage measurements and the data transmission measurements from each access point 30. In that sense, in FIG. 3A, from the perspective of the network controller 20, the ACCs are locally determined. In FIG. 3B, the ACC is determined by each access point 30 and then the determined ACC of each access point 30 is retrieved by the network controller 20. In that sense, in FIG. 3B, from the perspective of the network controller 20, the ACCs are remotely determined.

Hence, as illustrated in FIG. 3B, after having determined channel usage measurements and data transmission measurements, each access point 30 determine its ACC (at 318).

The network controller 20 then retrieves the determined ACC from each access point 30 (at 320). In some embodiments, the access points 30 may be configured to autonomously (i.e. without previously receiving a request) transmit their ACC to the network controller 20. This autonomous transmission may be periodic or aperiodic. In such embodiments, retrieving the ACC from each access point 30 may thus simply entail receiving the ACC from each access point 30. In other embodiments, retrieving the ACC from each access point 30 may comprise the network controller 20 requesting the ACC from each access point 30, e.g., via a request message, and then receiving the requested ACC from each access point 30. Notably, in such embodiments, the determination of the ACC by the access points 30 may occur after the access points 30 receive the request for the ACC but before the access points 30 transmit their determined ACC.

Once the network controller 20 has retrieved the ACC of each access point 30, the network controller 20 further proceeds as in FIG. 3A.

Figure 4:
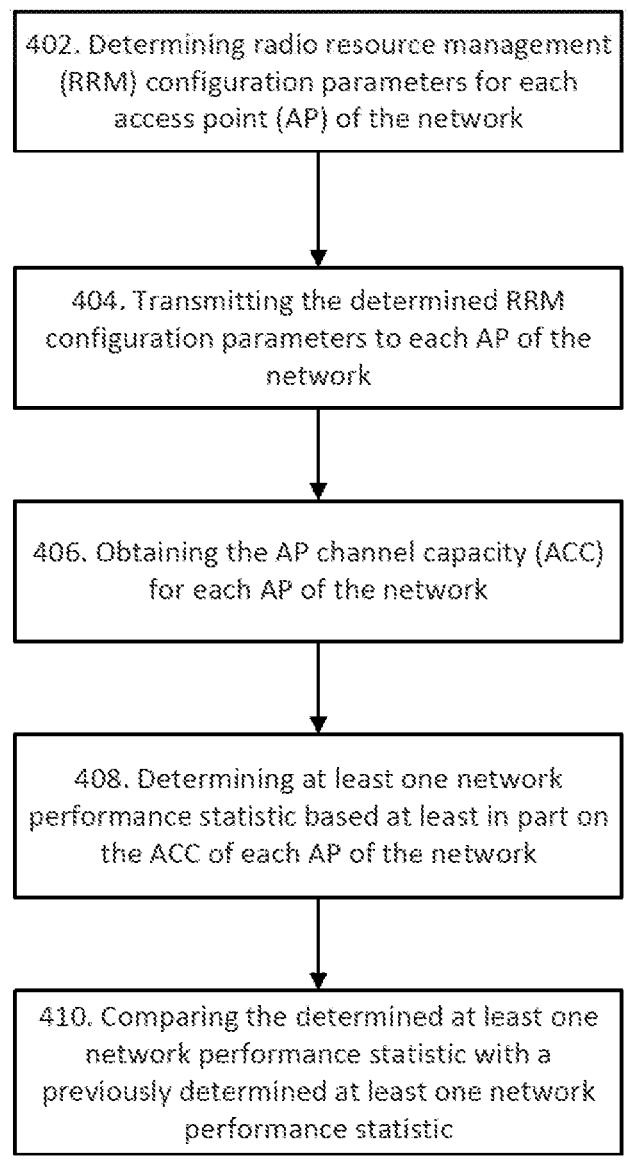
FIG. 4 illustrates a flow chart of the operation of a network controller in accordance with some embodiments.

FIG. 4 is a flow chart that illustrates the operation of the network controller 20 in accordance with some embodiments. As illustrated, the network controller 20 determines the RRM configuration parameters (e.g. channel selection, transmit power control, etc.) for each access point 30 in the network 10 (step 402). The network controller 20 then transmits the determined RRM configuration parameters to each access point 30 (step 404). The transmission of the RRM configuration parameters to each access point 30 may be performed using a configuration message. In some embodiments, the configuration messages may be messages compliant with the TR-069 technical specification such as the SetParameterValues or SetParameterAttributes message. At some point later after the transmission of the RRM configuration parameters, the network controller 20 obtains the ACC of each access point 30 (step 406). Once the network controller 20 has obtained the ACC for each access point 30, the network controller 20 determines, or otherwise derives, at least one network performance statistic based at least in part on the ACC of each access point 30. As indicated above, the network controller 20 may determine, or otherwise derive, one network performance statistic or a combination of network performance statistics depending, for instance, on which aspect or aspects of the RRM configuration needs improvement or adjustment. The network controller 20 then compares the at least one determined network performance statistic, that is the network performance statistic resulting from the current RRM configuration, with at least one previously determined network performance statistic, that is the network performance statistic resulting from a previous RRM configuration. The result of the comparison may assist the network controller 20, and ultimately the network operator, in ascertaining whether the current RRM configuration parameters have resulted in better, equal, or worse network performances. The result of the comparison may also be used to determine new RRM configuration parameters. Understandably, the operations illustrated in FIG. 4 may be repeated periodically and/or upon the occurrences of predetermined event or events.

As indicated above, the network controller 20 may obtain the ACC for each access point locally or remotely. In that sense, FIG. 5A is a flow chart of the operations of the network controller 20 when the network controller 20 obtains the ACC for each access point locally according to some embodiments, while FIG. 5B is a flow chart of the operations of the network controller 20 when the network controller 20 obtains the ACC for each access point remotely according to some embodiments.

Figure 5A:
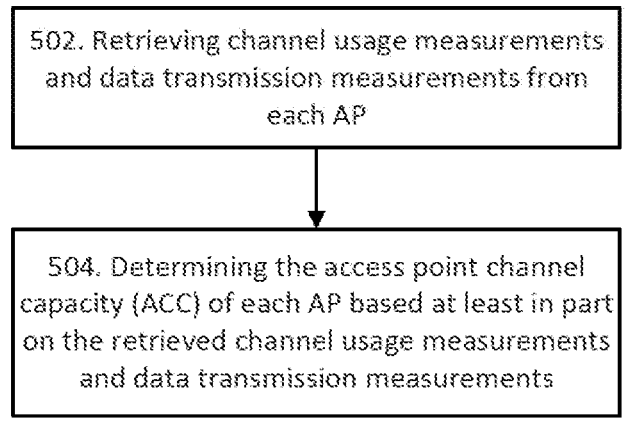
FIGS. 5A and 5B illustrate flow charts of the operation of a network controller to obtain a channel capacity of an access point in accordance with some embodiments.

As illustrated in FIG. 5A, to obtain the ACC for each access point locally, the network controller 20 first retrieves channel usage measurements and data transmission measurements from each access point 30. In some embodiments, retrieving the channel usage measurements and data transmission measurements from each access point 30 may comprise simply receiving the channel usage measurements and data transmission measurements from each access point 30 if, for instance, the access points 30 are configured to autonomously transmit their channel usage measurements and data transmission measurements to the network controller 20. In some embodiments, retrieving the channel usage measurements and data transmission measurements from each access point 30 may comprise requesting the channel usage measurements and data transmission measurements from each access point 30, for instance via request messages transmitted to each access point 30, and then receiving the channel usage measurements and data transmission measurements from each access point 30. In some embodiments, the request messages may be messages compliant with the TR-069 technical specification such as the GetParameterValues or GetParameterAttributes message. Regardless, the network controller 20 then determines the ACC of each access point 30 based at least in part on the retrieved channel usage measurements and data transmission measurements.

Figure 5B:
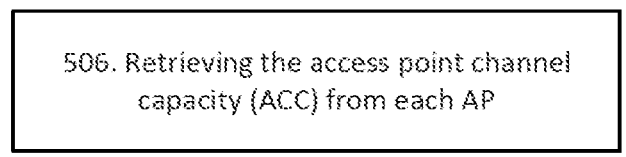

As illustrated in FIG. 5B, when the network controller 20 obtains the ACC for each access point 30 remotely, the network controller 20 retrieves the ACC for each access point 30. In some embodiments, retrieving the ACC for each access point 30 may comprise simply receiving the ACC for each access point 30 if, for instance, the access points 30 are configured to determine their ACC and autonomously transmit their respective ACC to the network controller 20. In some embodiments, retrieving the ACC for each access point 30 may comprise requesting the ACC for each access point 30, for instance via request messages transmitted to each access point 30, and then receiving the ACC for each access point 30. In some embodiments, the request messages may be messages compliant with the TR-069 technical specification such as the GetParameterValues or GetParameterAttributes message.

Notably, depending on the configuration of each access point 30, some access points 30 may only be able to transmit their channel usage measurements and data transmission measurements to the network controller 20 while other access points 30 may be able to determine their ACC and then transmit it to the network controller 20.

Figure 6B:
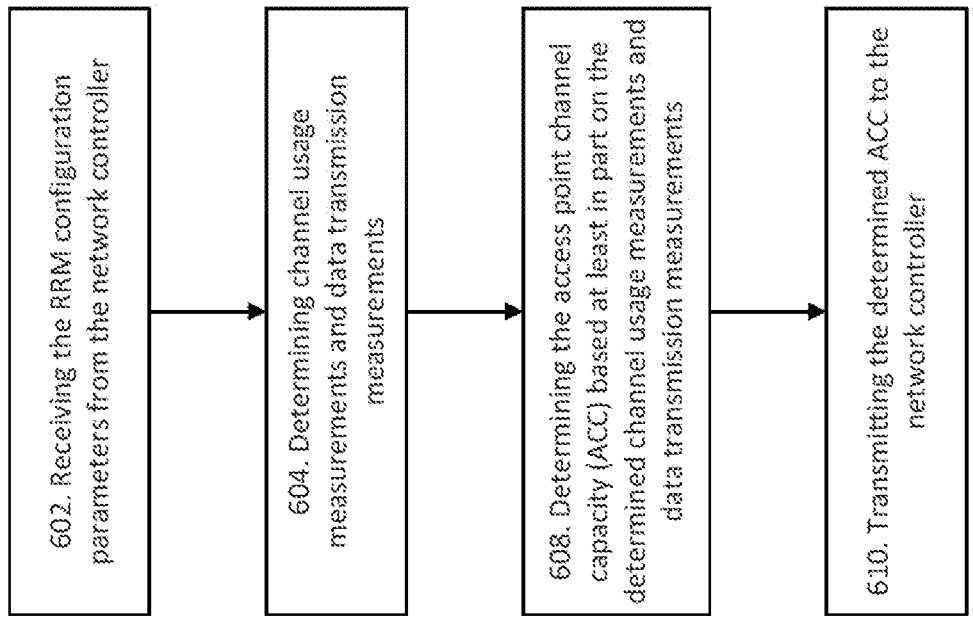
FIGS. 6A and 6B illustrate flow charts of the operation of an access point in accordance with some embodiments.
Figure 6A:
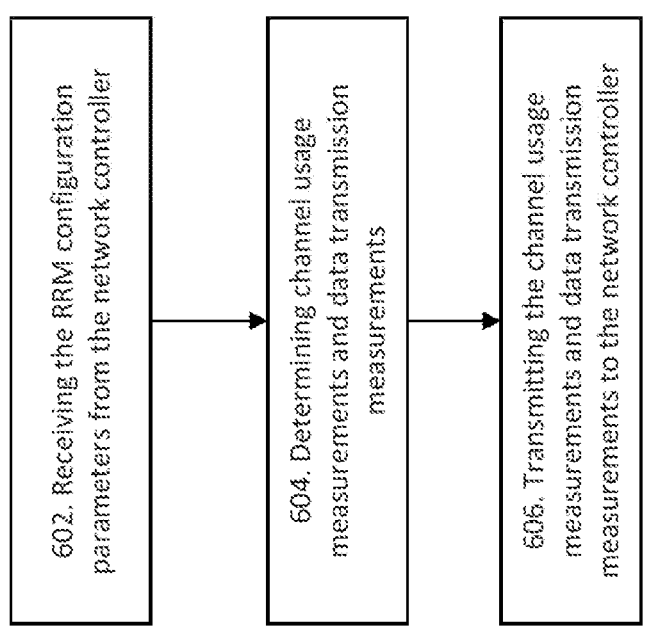

In that sense, FIGS. 6A and 6B are flow charts illustrating the operations of an access point 30 according to some embodiments.

In FIG. 6A, the access point 30 receives the RRM configuration parameters from the network controller 20 (step 602). The RRM configuration parameters may comprise channel selection, transmit power control, etc. The access point 30 then determines channel usage measurements and data transmission measurements for a predetermined period of time (step 604). In some embodiments, determining channel usage measurements and data transmission measurements for a predetermined period of time may be performed automatically and possibly periodically. In some embodiments, determining channel usage measurements and data transmission measurements for a predetermined period of time may be performed upon receiving a request from the network controller 20. Regardless, the access point 30 then transmits the determined channel usage measurements and data transmission measurements to the network controller 20 (step 606).

In FIG. 6B, as in FIG. 6A, the access point 30 receives the RRM configuration parameters (e.g. channel selection, transmit power control, etc.) from the network controller 20 (step 602), and then determines channel usage measurements and data transmission measurements for a predetermined period of time (step 604). However, in FIG. 6B, the access point 30 determines its own ACC based at least in part on the determined channel usage measurements and data transmission measurements (step 608). The access point 30 then transmits the determined ACC to the network controller 20 (step 610).

In some embodiments, the network controller 20 may be operative or otherwise configured to determine RRM configuration parameters (e g channel selection, transmit power control, etc.) for each access point 30 in the network 10, transmit the determined RRM configuration parameters to each access point 30, obtain the ACC for each access point 30, determine, or otherwise derive, at least one network performance statistic based at least in part on the ACC of each access point 30, and compare the at least one determined network performance statistic with at least one previously determined network performance statistic.

Figure 7:
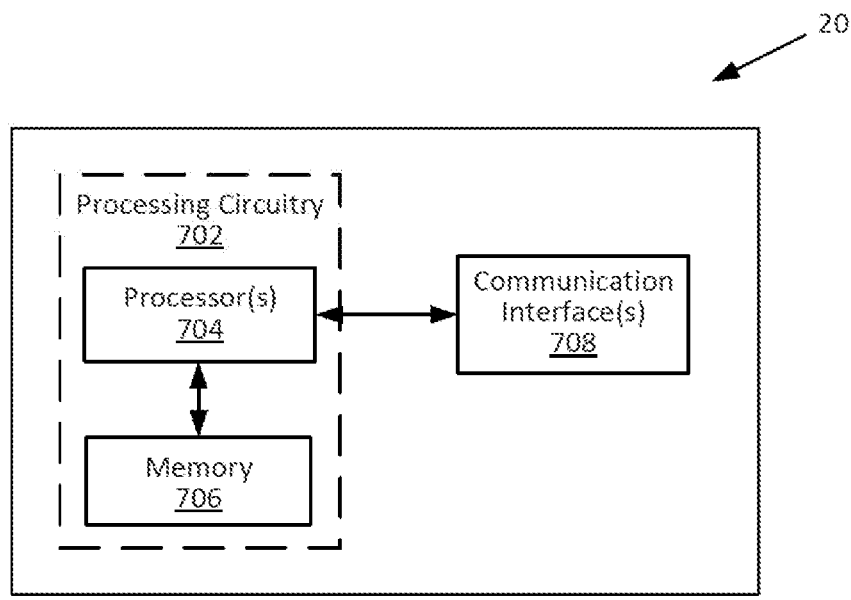
FIG. 7 illustrates a block diagram of a network controller in accordance with some embodiments.
Figure 8:
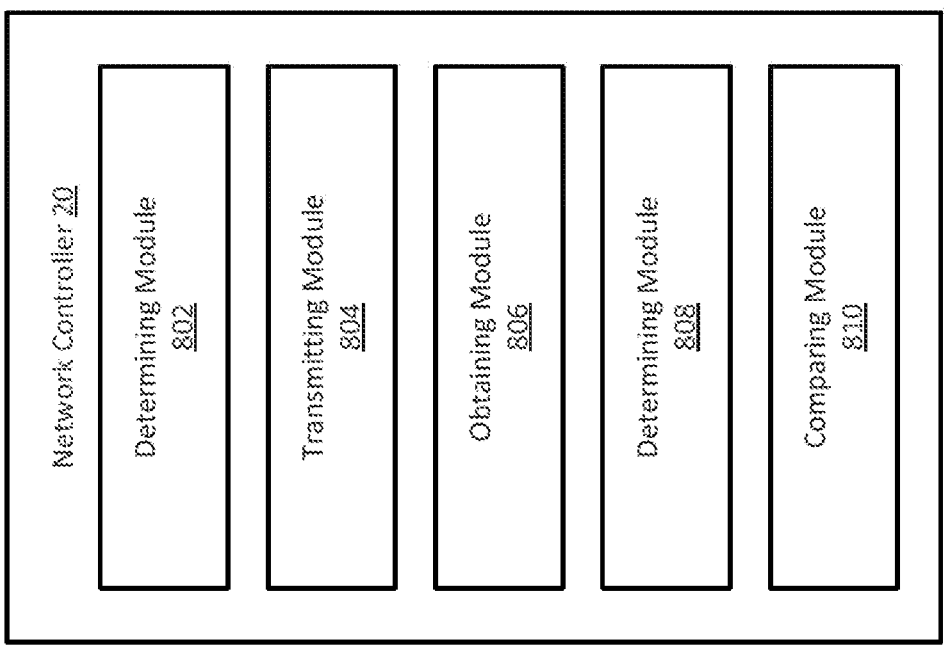
FIG. 8 illustrates another block diagram of a network controller in accordance with some embodiments.

Referring to FIGS. 7 and 8, block diagrams of embodiments of network controller 20 that can be used in one or more of the non-limiting example embodiments described are illustrated. In FIG. 7, the network controller 20 comprises processing circuitry 702, which may comprise one or more processors 704, hardware circuits (e.g. application-specific integrated circuit (ASIC), field-programmable gate array (FPGA), etc.), firmware, or a combination thereof. Processing circuitry 702, in some embodiments, operates in conjunction with memory 706 that stores instructions for execution by one or more processors 704 of the processing circuitry 702. Memory 706 may comprise one or more volatile and/or non-volatile memory devices. Program code for controlling the overall operations of the network controller 20 are, in some embodiments, stored in a non-volatile memory, such as a read-only memory or flash memory. Temporary data generated during operations may be stored in random access memory. The program code stored in memory, when executed by the processing circuitry 702, causes the processing circuitry 702 to perform the methods described above in relation to the network controller 20. The network controller 20 also comprises one or more communication interface(s) 708 for communicating with the access points 30, directly or over a communication network, and/or with one or more network nodes. The communication interface 708 may comprise one or more transmitter and one or more receiver. Additionally, or alternatively, the communications interface may comprise one or more transceiver combining both transmission and reception capabilities. The communication interface 708 may operate according to known communication standards (e.g. 3GPP standards, IEEE standards, IETF standards, etc.).

In FIG. 8, the network controller 20 is illustrated as comprising a plurality of functional modules which may, in some embodiments, be implemented as hardware, software, or combination thereof. Regardless, in FIG. 8, network controller 20 comprises a determining module 802 configured to determine the RRM configuration parameters (e g channel selection, transmit power control, etc.) for each access point 30 in the network 10, and a transmitting module 804 configured to transmit the determined RRM configuration parameters to each access point 30. The network controller 20 also comprises an obtaining module 806 configured to obtain the ACC of each access point 30. In some embodiments, the obtaining module 806 may be configured to obtain the ACC of each access point 30 by retrieving channel usage measurements and data transmission measurements from each access point 30 and then determining the ACC for each access point 30 based at least in part on the retrieved channel usage measurements and data transmission measurements. In some embodiments, the obtaining module 806 may be configured to obtain the ACC of each access point 30 by retrieving the ACC from each access point 30. The network controller 20 also comprises a determining module 808 configured to determine at least one network performance statistic based at least in part on the obtained ACC of each access point 30, and a comparing module 810 configured to compare the at least one determined network performance statistic with at least one previously determined network performance statistic, that is the network performance statistic resulting from a previous RRM configuration.

It will be appreciated that the various modules may be implemented as combination of hardware and/or software, for instance, the processing circuitry 702 (which may include processor(s) 704 and memory 706), and communication interface(s) 708 of network controller 20 shown in FIG. 7. Some embodiments may also include additional modules and/or sub-modules to support or implement additional and/or optional functionalities.

In some embodiments, the access point 30 may be operative or otherwise configured to receive RRM configuration parameters (e.g. channel selection, transmit power control, etc.) from the network controller 20, and determine channel usage measurements and data transmission measurements for a predetermined period of time. In some embodiments, the access point 30 may be operative or otherwise further configured to transmit the determined channel usage measurements and data transmission measurements to the network controller, while in some embodiments, the access point 30 may be operative or otherwise further configured to determine the ACC based at least in part on the determined channel usage measurements and data transmission measurements, and transmit the determined ACC to the network controller 20.

Figure 9:
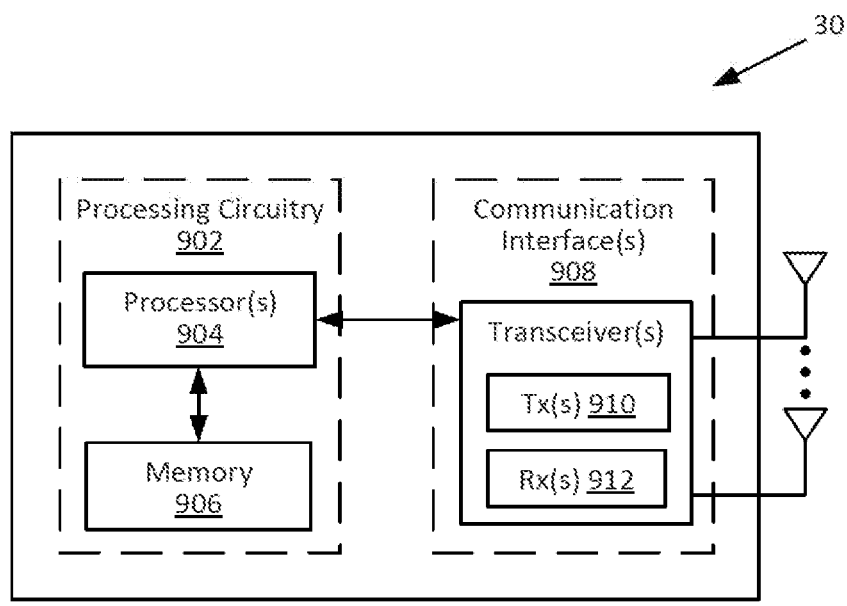
FIG. 9 illustrates a block diagram of an access point in accordance with some embodiments.
Figure 10:
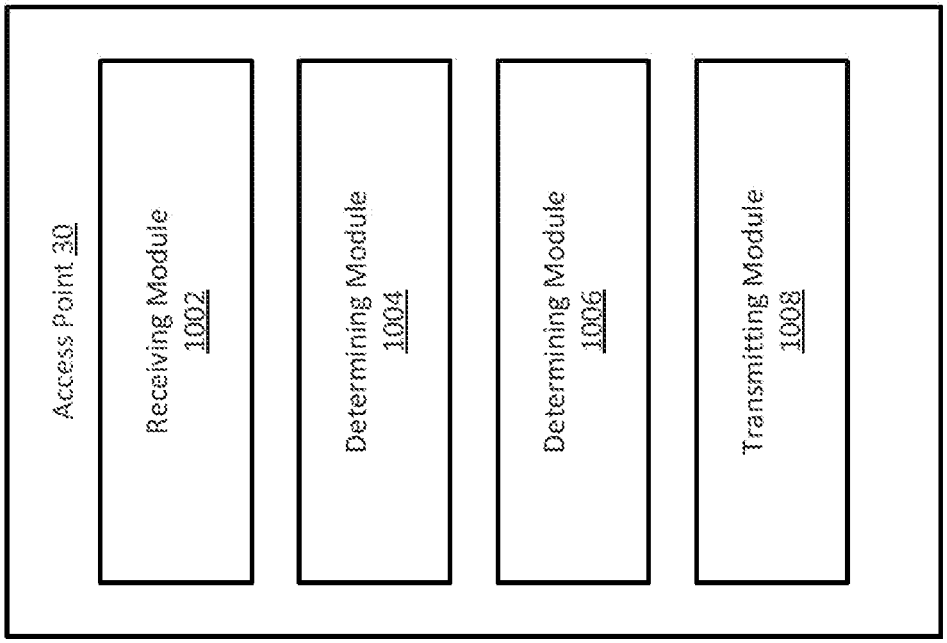
FIG. 10 illustrates another block diagram of an access point in accordance with some embodiments.

FIGS. 9 and 10 are block diagrams illustrating embodiments of access point 30 that can be used in one or more of the non-limiting example embodiments described are illustrated.

In FIG. 9, the access point 30 comprises processing circuitry 902, which may comprise one or more processors 904, hardware circuits (e.g. application-specific integrated circuit (ASIC), field-programmable gate array (FPGA), etc.), firmware, or a combination thereof. Processing circuitry 902, in some embodiments, operates in conjunction with memory 906 that stores instructions for execution by one or more processors 904 of the processing circuitry 902. Memory 906 may comprise one or more volatile and/or non-volatile memory devices. Program code for controlling the overall operations of the access point 30 is, in some embodiments, stored in a non-volatile memory, such as a read-only memory or flash memory. Temporary data generated during operations (e.g. channel usage measurements, data transmission measurements, ACC, etc.) may be stored in random access memory. The program code stored in memory, when executed by the processing circuitry 902, causes the processing circuitry 902 to perform the methods described above in relation to the access point 30. The access point 30 also comprises one or more communication interface(s) 908 for communicating with the network controller 20, directly or over a communication network, with wireless stations 40 over a radio interface, and/or with one or more network nodes (e.g. other access points 30 in the network 10). The communication interface 908 may comprise one or more transmitter(s) 910 and one or more receiver(s) 912. Additionally, or alternatively, the communication interface 908 may comprise one or more transceiver combining both transmission and reception capabilities. The communication interface(s) 908 may operate according to known communication standards (e.g. 3GPP standards, IEEE standards, IETF standards, etc.).

In FIG. 10, the access point 30 is illustrated as comprising a plurality of functional modules which may, in some embodiments, be implemented as hardware, software, or combination thereof. Regardless, in FIG. 10, access point 30 comprises a receiving module 1002 configured to receive the RRM configuration parameters (e g channel selection, transmit power control, etc.) determined by the network controller 20. The access point 30 also comprises a determining module 1004 configured to determine channel usage measurements and data transmission measurements for a predetermined period of time. The access point 30 also comprises a determining module 1006 configured to determine the ACC of the access point 30 based at least in part on the determined channel usage measurements and data transmission measurements. The access point 30 further comprises a transmitting module 1008 configured to transmit the determined ACC to the network controller. In some embodiments, the transmitting module 1008 may be configured to transmit the determined ACC automatically and possibly periodically, while in other embodiments, the transmitting module 1008 may be configured to transmit the determined ACC upon receiving a request.

It will be appreciated that the various modules may be implemented as combination of hardware and/or software, for instance, the processing circuitry 902 (which may include processor(s) 904 and memory 906), and communication interface(s) 908 of access point 30 shown in FIG. 9. Some embodiments may also include additional modules and/or sub-modules to support or implement additional and/or optional functionalities.

Though various embodiments have been described in the context of a single network 10, in some embodiments, the network controller 20 could be responsible for only a portion, i.e. a sub-network, of a larger network. In such embodiments, the network controller 20 could thus be responsible for only some access points 30 of the entire network, that is for the access points 30 part of the sub-network. For example, the network controller 20 could be responsible for the access points 30 located in a given geographical area (e.g. a city, a state, etc.) part of a larger geographical area (e.g. a state, a country, etc.). In such embodiments, the network could comprise more than one network controller 20, each responsible for a portion of the network.

Some embodiments may be represented as a software product stored in a machine-readable medium (also referred to as a computer-readable medium, a processor-readable medium, or a computer usable medium having a computer readable program code embodied therein). The machine-readable medium may be any suitable tangible medium including a magnetic, optical, or electrical storage medium including a diskette, compact disk read only memory (CD-ROM), digital versatile disc read only memory (DVD-ROM) memory device (volatile or non-volatile), or similar storage mechanism. The machine-readable medium may contain various sets of instructions, code sequences, configuration information, or other data, which, when executed, cause a processor to perform steps in a method according to some embodiments. Those of ordinary skill in the art will appreciate that other instructions and operations necessary to implement the described embodiments may also be stored on the machine-readable medium. Software running from the machine-readable medium may interface with circuitry to perform the described tasks.

The above-described embodiments are intended to be examples only. Alterations, modifications and variations may be effected to the particular embodiments by those of skill in the art without departing from the scope of the description.

What is claimed is:

1. A method of operating a network controller in a wireless local area network, WLAN, comprising a plurality of access points, the method comprising:
    determining radio resource management, RRM, configuration parameters for each of the plurality of access points;
    transmitting the determined RRM configuration parameters to each of the plurality of access points;
    obtaining a channel capacity of each of the plurality of access points, wherein the channel capacity is equal to data transmission measurements determined during a predetermined time period scaled by a channel usage factor determined during the predetermined time period, wherein the channel usage factor is a function of a ratio between a channel idle time measurement determined during the predetermined time period and a channel busy time measurement determined during the predetermined time period; and
    determining at least one network performance statistic for the WLAN based at least in part on the channel capacity of each of the plurality of access points.

2. The method as claimed in claim 1, further comprising:
    comparing the determined at least one network performance statistic with a previously determined at least one network performance statistic;
    determining new RRM configuration parameters for each of the plurality of access points based at least in part on the result of the comparison.

3. The method as claimed in claim 1, wherein obtaining a channel capacity of each of the plurality of access points comprises retrieving the channel capacity from each of the plurality of access points.

4. The method as claimed in claim 3, wherein retrieving the channel capacity from each of the plurality of access points comprises receiving the channel capacity from each of the plurality of access points.

5. The method as claimed in claim 4, wherein obtaining a channel capacity of each of the plurality of access points further comprises requesting the channel capacity from each of the plurality of access points prior to receiving the channel capacity from each of the plurality of access points.

6. The method as claimed in claim 1, wherein obtaining a channel capacity of each of the plurality of access points comprises retrieving the data transmission measurements, the channel idle time measurement, and the channel busy time measurement determined during the predetermined time period from each of the plurality of access points, and determining the channel capacity of each of the plurality of access points.

7. The method as claimed in claim 6, wherein retrieving the data transmission measurements, the channel idle time measurement, and the channel busy time measurement determined during the predetermined time period from each of the plurality of access points comprises receiving the data transmission measurements, the channel idle time measurement, and the channel busy time measurement determined during the predetermined time period from each of the plurality of access points.

8. The method as claimed in claim 7, wherein retrieving the data transmission measurements, the channel idle time measurement, and the channel busy time measurement determined during the predetermined time period from each of the plurality of access points further comprises requesting the data transmission measurements, the channel idle time measurement and the channel busy time measurement determined during the predetermined time period from each of the plurality of access points prior to receiving the data transmission measurements, the channel idle time measurement, and the channel busy time measurement determined during the predetermined time period from each of the plurality of access points.

9. The method as claimed in claim 1, wherein the data transmission measurements comprise a transmitted data measurement and a received data measurement.

10. A network controller for use in a wireless local area network, WLAN, comprising a plurality of access points, the network controller being configured to:
 determine radio resource management, RRM, configuration parameters for each of the plurality of access points;
 transmit the determined RRM configuration parameters to each of the plurality of access points;
 obtain a channel capacity of each of the plurality of access points, wherein the channel capacity is equal to data transmission measurements determined during a predetermined time period scaled by a channel usage factor determined during the predetermined time period, wherein the channel usage factor is a function of a ratio between a channel idle time measurement determined during the predetermined time period and a channel busy time measurement determined during the predetermined time period; and
 determine at least one network performance statistic for the WLAN based at least in part on the channel capacity of each of the plurality of access points.

11. The network controller as claimed in claim 10, further configured to:
 compare the determined at least one network performance statistic with a previously determined at least one network performance statistic;
 determine new RRM configuration parameters for each of the plurality of access points based at least in part on the result of the comparison.

12. The network controller as claimed in claim 10, further configured to retrieve the channel capacity from each of the plurality of access points.

13. The network controller as claimed in claim 12, wherein to obtain the channel capacity of each of the plurality of access points, the network controller is further configured to receive the channel capacity from each of the plurality of access points.

14. The network controller as claimed in claim 13, wherein to obtain the channel capacity of each of the plurality of access points, the network controller is further configured to request the channel capacity from each of the plurality of access points prior to receiving the channel capacity from each of the plurality of access points.

15. The network controller as claimed in claim 10, wherein to obtain the channel capacity of each of the plurality of access points, the network controller is further configured to retrieve the data transmission measurements, the channel idle time measurement and the channel busy time measurement determined during the predetermined time period from each of the plurality of access points, and determine the channel capacity of each of the plurality of access points.

16. The network controller as claimed in claim 15, wherein to retrieve the data transmission measurements, the channel idle time measurement, and the channel busy time measurement determined during the predetermined time period from each of the plurality of access points, the network controller is further configured to receive the data transmission measurements, the channel idle time measurement, and the channel busy time measurement determined during the predetermined time period from each of the plurality of access points.

17. The network controller as claimed in claim 16, wherein to retrieve the data transmission measurements, the channel idle time measurement, and the channel busy time measurement determined during the predetermined time period from each of the plurality of access points, the network controller is further configured to request the data transmission measurements, the channel idle time measurement, and the channel busy time measurement determined during the predetermined time period from each of the plurality of access points prior to receiving the data transmission measurements, the channel idle time measurement, and the channel busy time measurement determined during the predetermined time period from each of the plurality of access points.

18. The network controller as claimed in claim 10, wherein the data transmission measurements comprise a transmitted data measurement and a received data measurement.

* * * * *